(12) United States Patent
Wang

(10) Patent No.: US 6,775,013 B2
(45) Date of Patent: Aug. 10, 2004

(54) METHOD AND APPARATUS FOR MEASURING DISPLACEMENT OR MOTION ERROR

(75) Inventor: Charles Wang, Compton, CA (US)

(73) Assignee: Optodyne, Inc., Compton, CA (US)

( * ) Notice: Subject to any disclaimer, the term of this patent is extended or adjusted under 35 U.S.C. 154(b) by 179 days.

(21) Appl. No.: 10/091,388

(22) Filed: Mar. 5, 2002

(65) Prior Publication Data

US 2002/0126297 A1 Sep. 12, 2002

Related U.S. Application Data

(60) Provisional application No. 60/273,904, filed on Mar. 7, 2001.

(51) Int. Cl.[7] .............................................. G01B 11/14
(52) U.S. Cl. .................... 356/614; 356/615; 356/152.3; 356/138; 356/426
(58) Field of Search ................................ 356/614, 615, 356/622, 399, 153, 152.3, 138, 139.1, 426

(56) References Cited

U.S. PATENT DOCUMENTS 5,760,731 A * 6/1998 Holmes ...................... 342/118
5,796,485 A * 8/1998 Dassler et al. .............. 356/613
6,008,834 A * 12/1999 Lewis et al. ................. 347/241

* cited by examiner

*Primary Examiner*—Frank G. Font
*Assistant Examiner*—Roy M. Punnoose
(74) *Attorney, Agent, or Firm*—Russell Hattis

(57) ABSTRACT

The degree to which a rotating object like a machine tool spindle undesirably wobbles in directions both transverse and parallel to its axis of rotation is measured preferably by providing a laser beam or other beam energy source which directs the beam toward a beam reflecting surface, most advantageously a curved surface, like a spherical or cylindrical surface. The reflecting surface is most advantageously formed by a spherical body mounted for adjustment in a plane perpendicular to the rotating axis involved, so that the center of the curved surface can be positioned as close as possible to the axis involved before error measurements are taken. In such case, the distance the beam traverses between the beam source and the point on the curved surface struck by the beam is a measure of the degree to which the spindle undesirably wobbles in directions both transverse to and parallel to the spindle axis. The beam source and the beam traverse distance measuring means can be a commercially available laser head which by use of focussing means, if needed, returns the reflected beam to the laser head which is designed to produce beam traverse distance measurement data.

25 Claims, 4 Drawing Sheets

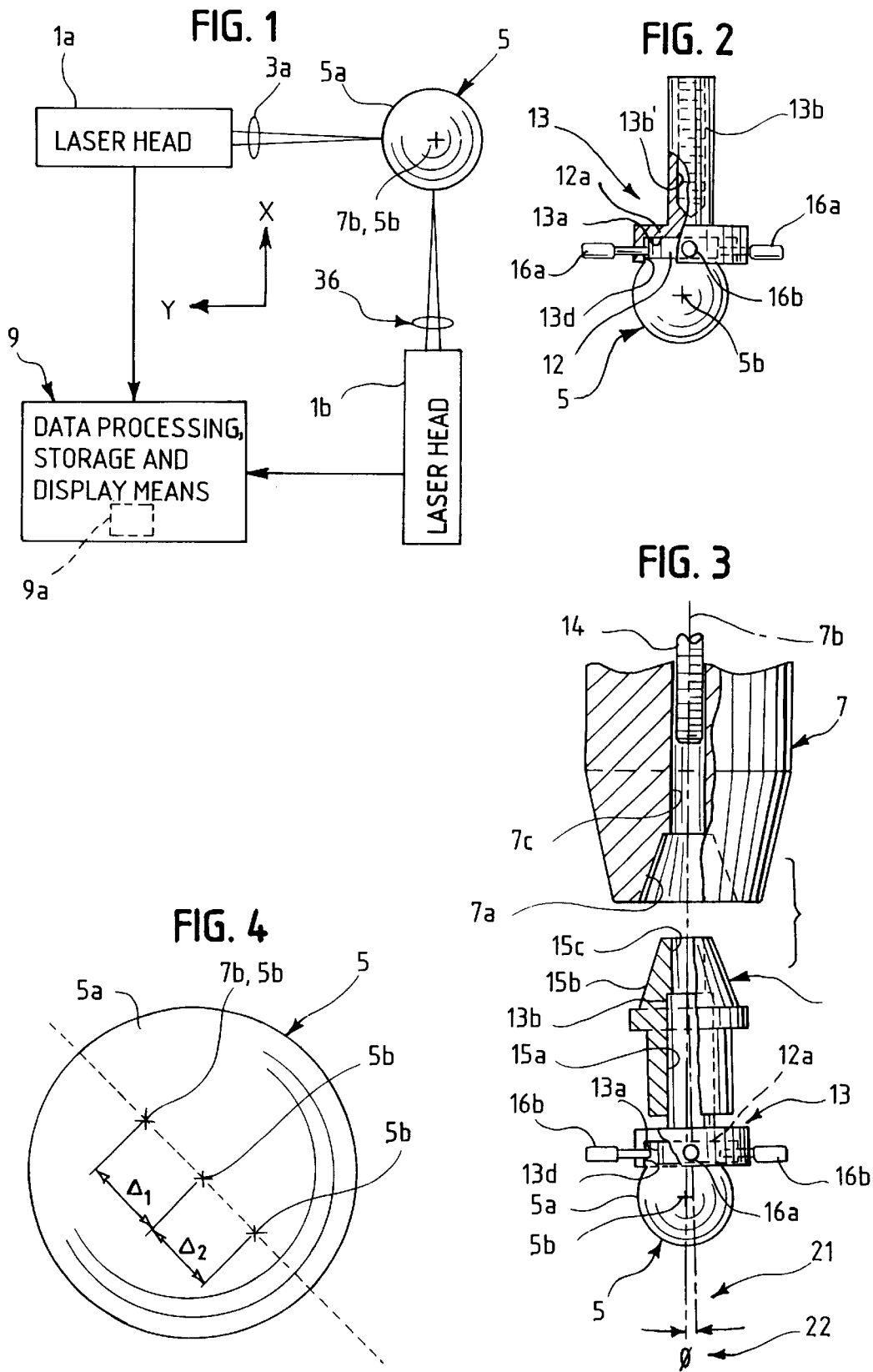

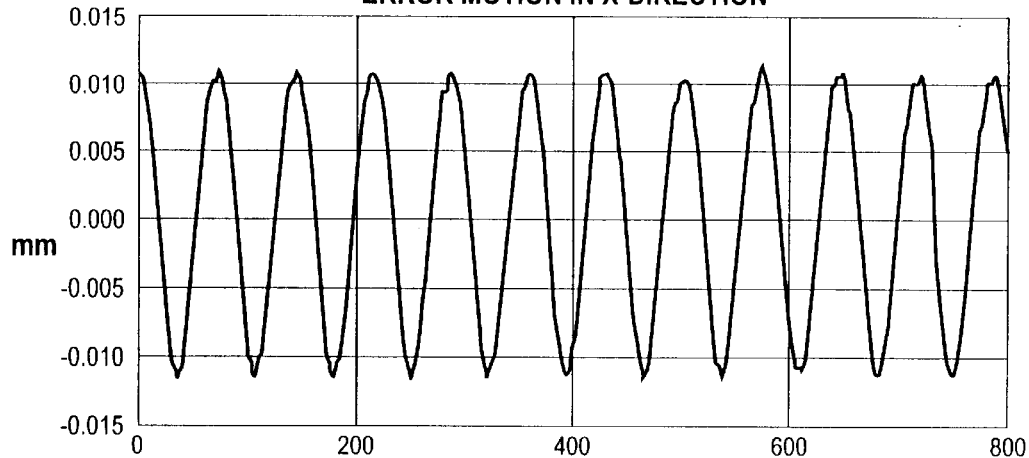
FIG. 5a ERROR MOTION IN X-DIRECTION
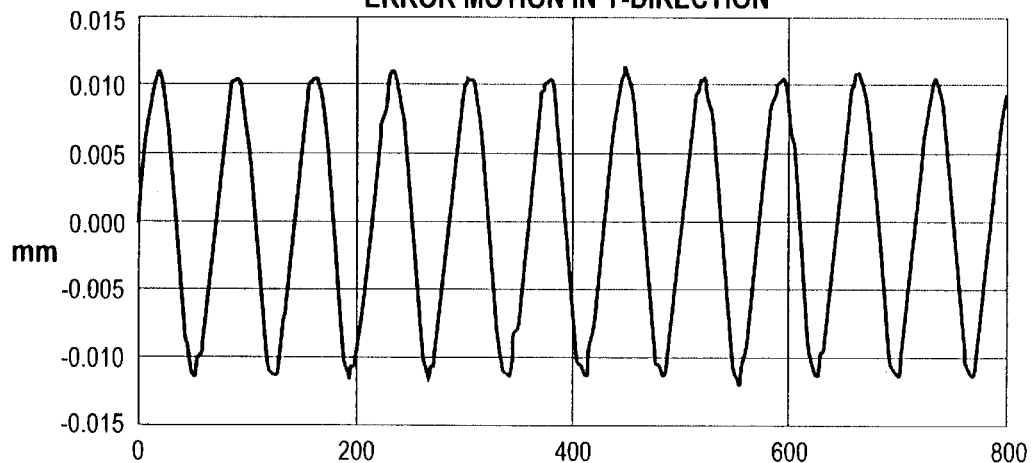
FIG. 5b ERROR MOTION IN Y-DIRECTION
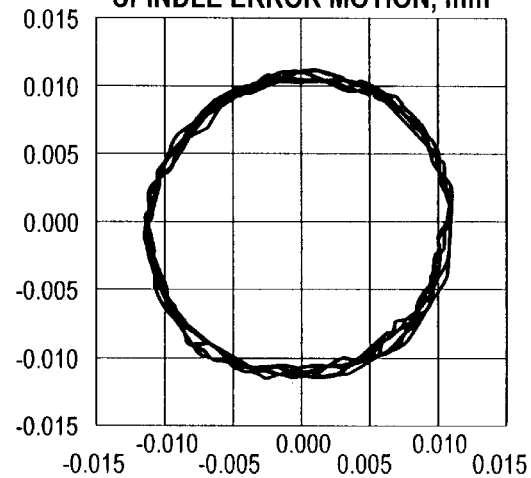
FIG. 6 SPINDLE ERROR MOTION, mm

METHOD AND APPARATUS FOR MEASURING DISPLACEMENT OR MOTION ERROR

RELATED APPLICATION

This application is based on Provisional Application No. 60/273,904 filed Mar. 7, 2001.

BACKGROUND OF THE INVENTION

This invention has one of its most important applications in measuring the motion error of the spindle of machine tools, although it has other applications as well. In today's manufacturing world, high-speed machine tools with high feed rates and high-speed spindles are frequently required to deliver accuracy in the order of a few micrometers. It is important that the spindle error motion be measured and maintained to within the allowed tolerance.

Briefly, the major spindle motion error is caused by the lack of alignment of the spindle rotational axis, the centerline of the tool holder and the centerline of the tool. All of these should be coaxial. Any deviation from this coaxial relationship will generate eccentric motion error. Other causes of radial and axial error motions are the spindle bearings, structure error motion, etc as described in Ref. 1.

Conventional measurement techniques using a precision spindle tester, capacitor transducers and an oscilloscope are complex and heavy as described in References 1 and 2. The prior art precision spindle testers are very heavy and need periodic calibration. The capacitor transducers are limited by the sensitivity, range and non-linearity.

Disclosed here is a new non-contact method for the measurement of axis of rotation motion error for both 3 anad 5 axis machines. The accuracy and resolution are high, the range is large, and there is no need for a heavy precision spindle tester(see Reference 3). The present invention preferably uses a laser system previously used for the measurement of the static volumetric positioning accuracy (Ref. 4) and the dynamic contouring accuracy (Ref. 5), with some simple unique accessories and data analysis software to provide the measurement of spindle motion error and any axis of rotation motion error. The additional cost of the accessories and the software is low. Hence, it is cost effective and time saving. Furthermore, the heavy precision tester is no longer needed.

Thus, as compared with conventional techniques, among the advantages of the invention are: higher accuracy and resolution; larger standoff distance; easy setup and operation; no need for a heavy tester and periodical calibration; and cost and time savings The application of this technique is not limited to spindle motion error determination; it can be applied to any axis of rotation spindle and other motion error. As above indicated, of perhaps less importance certain aspects of this invention have application in measuring the displacement motion of objects other than spindle motion.

Basic Theory Applied to Spindle Error Motion Measurement

The total spindle motion error at a constant rotational speed can be expressed as a function of the angle O within a single 360 degree rotation and the number of cycles i.

$$ri(\Theta)=rf+dr(\Theta)+dri(\Theta), i=1,2,3,\ldots N \qquad \text{Eq. 1}$$

where rf is the fundamental error motion, $dr(\Theta)$ is the residual error motion, $dri(\Theta)$ is the asynchronous error motion, $\Theta$ is the rotational angle, and N is the total number of cycles.

Here rf is due to the offset between the spindle axis of rotation and the center of the tool, $dr(\Theta)$ is due to the spindle bearing, the non-roundness of the sphere, and other synchronous error motion, and $dri (\Theta)$ is due to the structure error motion or other asynchronous error motion. Once the total spindle error motion $ri (\Theta)$ is measured, the rf, $dr(\Theta)$, $dri (\Theta)$ can be determined by the following relations:

$$rf = <<ri(O)>i>o \qquad \text{Eq. 2}$$

$$dr(\Theta)=<ri(O)>i-rf \qquad \text{Eq. 3}$$

where $< >i = \Sigma i\ [\ ]/N$ is the average over N cycles and $<>\Theta = \Sigma o \{\ \}/2\pi$ is the average over $2\pi$ angle.

For machine tool applications, there is a sensitive direction of spindle motion, defined as that component of axis motion that occurs in a direction that is directly toward or away from a cutting tool. There are two types of sensitive directions, one is the fixed sensitive direction, in which the work-piece is rotated by the spindle and the point of machining is fixed such as a lathe. The other is the rotating sensitive direction, in which the work-piece is fixed and the point of machining rotates with the spindle such as a milling machine.

There are 6 degrees of spindle error motion. However, as discussed in Ref (2) only three of them are relevant. These are the radial error motion, tilt error motion and axial error motion. The radial error motion is the error motion in a direction normal to the z-axis. The tilt error motion is the error motion in an angular direction relative to the z-axis. The axial error motion is the error motion co-linear with the z-axis.

Let the laser measurement in the x-direction be $\Delta X(\Theta)$ and in the y-direction be $\Delta Y(\Theta)$. For a fixed sensitive direction along the x-axis, the radial motion polar plot has the equation $$r(\Theta)=ro+\Delta X(\Theta) \qquad \text{Eq. 4}$$

where r0 is the base circle radius. For a rotating positive direction the radial motion is given by the equation $$r(\Theta)=r0+\Delta X(\Theta)\cos O+\Delta Y(\Theta) \sin O \qquad \text{Eq. 5}$$

In the analysis here, let the laser measurement in the x and y direction be $$\Delta X(\Theta)=A \cos \Theta+u(\Theta) \qquad \text{Eq. 6}$$

$$\Delta Y(\Theta)=A \sin \Theta+v(\Theta) \qquad \text{Eq. 7}$$

where A is the offset between spindle axis of rotation and the center of the sphere, $u(\Theta)$ and $v(\Theta)$ are the error motion in the x- and y-direction respectively. Assume $u(\Theta)$ and $v(\Theta)$ are much smaller than A, the radial error motion can be expressed as $$r(\Theta)=SQRT[\Delta X(\Theta)*\Delta X(\Theta)+\Delta Y(\Theta)*\Delta Y(\Theta)] \qquad \text{Eq. 8}$$

$$=A+u(\Theta) \cos (\Theta)+v(\Theta) \sin \Theta \qquad \text{Eq. 9}$$

This is similar to Eq. 5. For the fixed sensitive direction, the radial error motion can be expressed as $$r(\Theta)=\Delta X(\Theta) \qquad \text{Eq. 10}$$

$$=A \cos \Theta+u(\Theta) \qquad \text{Eq. 11}$$

To simplify the calculation, it sometimes can be assumed that the spindle error motion is axial symmetric. That is, the error motion measured in the x-direction is the same as measured in the y-direction shifted by 90 degree. Hence $$\Delta X(\Theta) = A \cos \Theta + u(\Theta) \qquad \text{Eq. 6}$$

$$\Delta Y(\Theta) = A \cos (\Theta - \pi/2) + u(\Theta - \pi/2) \qquad \text{Eq. 12}$$

$$= A \sin O + v(O) \qquad \text{Eq. 7}$$

where $v(\Theta) = u(\Theta - \pi/2)$ is a good approximation.

Hence, the radial error motion can be obtained by a laser measurement in the x-direction to be described.

Summary of Some of the Features of the Invention

The present invention, among other things, provides a method and means to measure displacement motion error of an object, such as a tool bit on the spindle of a 3 or 5 axis machine tool which spindle has either an intended fixed or variable spindle axis position, by the use of a curved, preferably spherically or cylindrically shaped beam energy reflecting surface attached to the end of the spindle. A source of beam energy, preferably a laser beam, is directed at this curved surface from a beam traverse distance measuring system like, for example, the single aperture laser head measuring apparatus disclosed in U.S. Pat. No. 5,116,126. The beam is initially directed toward what is assumed to be the nearest point on the reflecting surface where the beam would be reflected in the exact reverse direction from that of the incoming beam direction. Where this surface is a sphere or cylinder, the center of the sphere would be located where it is assumed the cutting point of the tool involved is to be located in the machine tool application of the invention.

If the beam direction is traverse to a rotating spindle, then any movement of the spindle which has a component traverse to the spindle axis will cause the beam to strike another portion of the curved reflecting surface further away from the previous point struck by the beam so that the beam is reflected at an angle to the incoming direction thereof. The distance traversed by the beam as measured by the beam traverse distance measuring apparatus involved, such as the laser head described in said patent, would be increased to a degree varying with the position of the curved surface struck by the beam relative to the closest position struck by the beam. To ensure that the reflected beam returns to the point of the measuring apparatus where it can be detected, a focusing lens can be placed between the measuring apparatus and the reflecting surface. As the spindle rotates, this measuring apparatus produces spindle motion error data which is a measure of the varying degrees to which the spindle undesirably wobbles in a direction transverse to its ideal stationary axis.

If the rotating spindle wobbles undesirably in an axial direction, any such axial movement will also vary the distance the beam traverses in the space between the measuring apparatus and the reflecting surface. In this example, this data is a measure of the spindle error motion along its axis. By using laser heads or the like directing their beams toward the reflecting surface along the x, y and z axes of the machine tool, the data developed by these laser heads represent the x, y and z axis motion errors for the sampling measuring times involved.

A 5-axis machine tool has a spindle with an inner portion which can be rotated, for example, about the z-axis and an inner portion which can either be aligned and fixed in position with respect to the inner portion of the spindle or, where the inner portion is not to be rotated, can be pivoted or rotated with respect to the inner portion of the spindle about either x or y axis directed axes of rotation. When the spindle axis of rotation is varied using any of these spindle rotation choices, error measurements like that just described with separate beam sources directing their beams along the x, y and z axes involved developes useful error motion data with which to evaluate the quality of the motion-imparting means involved.

Other aspects of the invention to be described in detail below include a unique test structure including a frame adjustably supporting the preferred spherical reflecting surface. A related aspect of the invention is the manner in which the position of the sphere is adjusted so that the center of the sphere which replaces the tool bit is located at the point where the cutting edge of the tool is to be located. The measurements referred to will then indicate the cutting tool motion error due to the undesired radial or angular wobbling of the spindle. Another aspect of the invention provides a visual presentation of the degree to which a rotating spindle having aligned inner and outer portions wobbles traverse to its axis of rotation. In this case, two laser head used simultaneously or one laser head used in sequence can direct laser beams respectively in x and y axis directions toward a spherical reflecting surface attached to the rotating spindle. The distance verses time data simultaneously developed by the lase head or heads which receive the reflected beams respectively produce sinusoidal and co-sinusoidal signals which when fed to the x and y axis inputs of a cathode ray tube or other similar display device produces a circular trace which shows the degree to which the spindle transversely wobbles during each revolution of the spindle at each of the angles involved.

DESCRIPTION OF DRAWINGS

FIG. 1 is a block diagram of the invention used to measure spindle motion error of a machine tool, as seen in the x-y plane, and showing two laser heads like that disclosed in U.S. Pat. No. 5,116,126 directing laser beams respectively in the x and y axis directions against a spherical reflecting surface carried on the end of a spindle rotating about its longitudinal axis oriented in the z axis direction, the Figure also showing the data storage, processing means which receives the laser head outputs and feeds the signals to a display means which produces the just described circular trace;

FIG. 2 is a vertical elevation, partially in section, of what is sometimes called a sphere tester, the sphere tester being a unique portion of a preferred form of the present invention which comprises the sphere shown in FIG. 1 secured permanently to a magnet adjustably mounted within a sphere support frame which fits within a conventional tool holder shown in FIG. 3;

FIG. 3 is an elevational view, partially in section, of the sphere tester shown in FIG. 2 as seen in a plane at right angles to that shown in FIG. 3, the sphere tester being mounted in a conventional tool holder in place of the tool bit and the tool holder being in position to be inserted into the bottom of the spindle of a machine tool. An angle O is there shown which is a possible undesired angle between the center line of the tool holder and a line between the top of the tool holder and the center of the sphere or tool bit;

FIG. 4 is a diagrammatic view illustrating the effect of rotating either the tool holder together with the sphere tester 180 degrees within the tapered bore of the spindle or rotating the sphere tester within the sphere support frame 180 degrees relative to a given fixed position of the spindle axis;

FIGS. 5a and 5b respectively show the data simultaneously taken by the laser heads shown in FIG. 1 directed in the x and y axis directions during several revolutions of the spindle about its axis and after the sphere has been rotated 180 degrees as shown in FIG. 4;

FIG. 6 shows the circular trace formed on the display means shown in FIG. 1 when the x and y axis input of the display means are fed the sinusoidal and co-sinusoidal signals repsresenting the laser head data shown in FIGS. 5*a* and 5*b*.

FIG. 7 also shows three laser heads respectively directing their beams in x, y and z axis directions toward the spherical reflecting surface of the sphere tester. The data outputs of the laser heads are shown extending to data processing, storage and display means shown in FIG. 1.

DESCRIPTION OF THE FORMS OF THE INVENTION SHOWN IN DRAWINGS

FIG. 1

Figure 7:
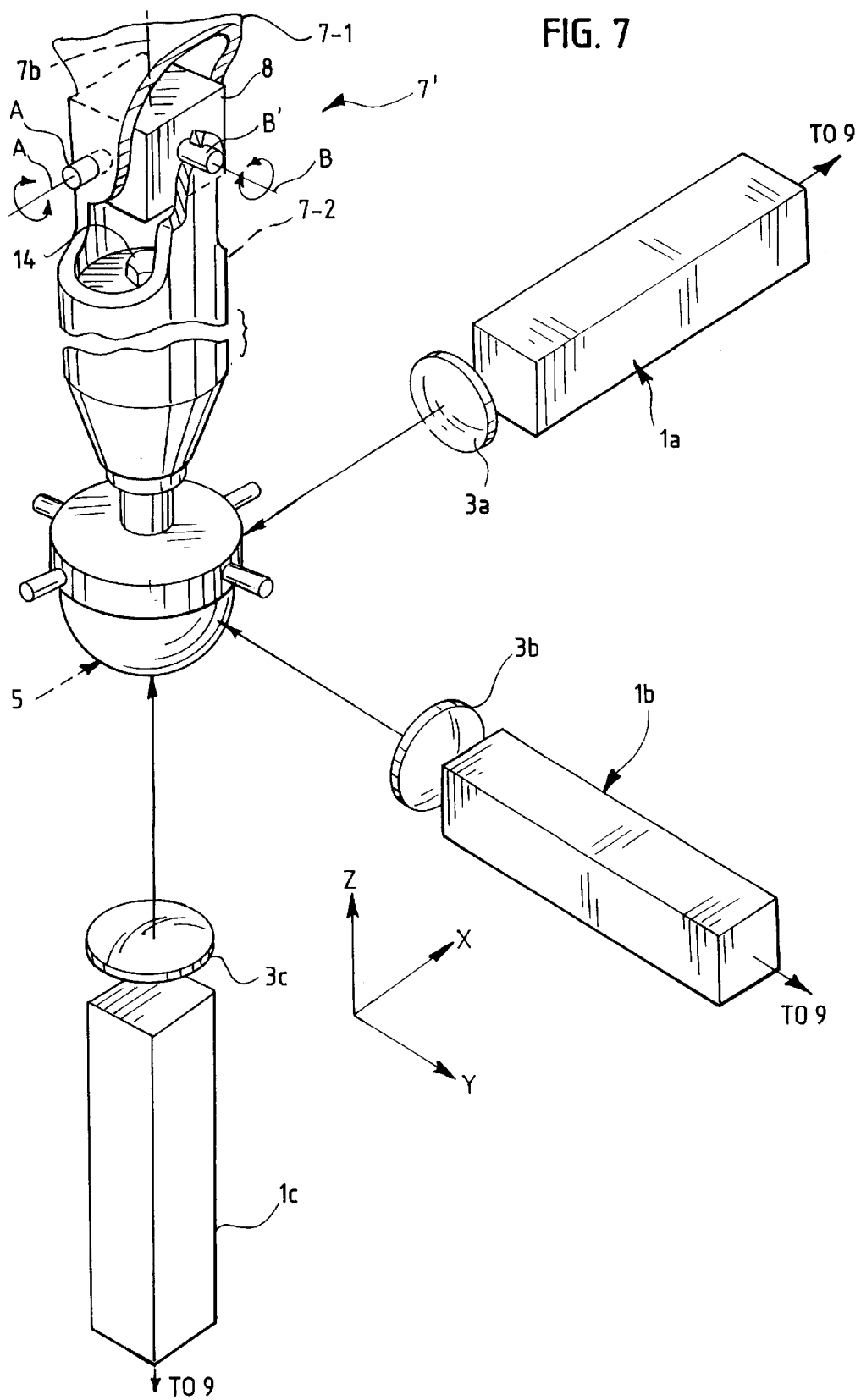
FIG. 7 is a perspective view of a two-part z-axis-pointing spindle 7' of a 5 axis machine tool with the sphere tester shown in FIGS. 2 and 3 attached to the outer portion 7-2 of the spindle 7'. The outer portion 7-2 of the spindle 7' is shown rotatable about either x or y axis directed axes of rotation A or B of drive shafts A' and B' carried by the inner portion 7-1 of the spindle 7' as shown in FIG. 8.

The block diagram of FIG. 1 shows single aperture laser heads 1*a* and 1*b* like that disclosed in U.S. Pat. No. 5,116,126 directing their beams respectively along x and y axes through focus lenses 3*a* and 3*b* against the nearest points on a spherical surface 5*a* of a near perfect spherical body 5 whose center 5*b* is located at or near the assumed z axis of rotation of a spindle 7 shown in FIG. 3. The spherical surface 5*a* is the outer surface of a solid spherical body 5 mounted for adjustment along the x and y axes in a manner to be described, to position the center 5*b* of the spherical body 5 at a point along the spindle's longitudinal axis where the cutting edge of a tool bit is to be located if the spindle is part of a machine tool. The laser heads 1*a* and 1*b* receive the reflected beams focused by the lenses 3*a* and 3*b* at the aperture where the beams emanated from the laser heads 1*a* and 1*b*. The focus lenses 3*a* and 3*b* would not be needed to return the reflected beams to the single aperture of the laser heads 1*a* and 1*b* if the spherical body was large relative to the distance between the laser heads 1*a* and 1*b* and the spherical surface 5*a*.

If the spindle 7 wobbles transversely of its desired stable rotating vertical axis relative to the x and y axes, the x and y axis directed beams will strike points on spherical surface 5*a* both nearest the laser heads where the reflected beams exactly follow the incoming beam path and also points located a greater distance away from the laser heads 1*a* and 1*b* and on opposite sides of these nearest points, where the beams are deflected at varying angles to the directions of the incoming beams. The distances traversed by the beams detected by the laser heads 1*a* and 1*b* will thus vary in proportion to the varying angles involved. The output of the laser heads 1*a* and 1*b* are thus signals which indicate these varying distances with time as the spindle 7 rotates and are a measure of spindle error motion relative to these axes.

These laser head outputs are fed to data processing, storage and display means shown as a box 9 which may be any conventional such means which stores the laser head output distance measurements verses time data, and generates signals which selectively display in print or other form this data in numerical or curve form. For example, this means can include a display means 9*a* which could be a cathode ray tube or like device with x and y inputs to which the sinusoidal and co-sinusoidal signals shown in FIGS. 5*a* and 5*b* simiultanously derived from the laser head outputs as the spindle 7 is rotated are fed, to produce the circular spindle motion error waveform shown in FIG. 6.

FIGS. 2 and 3

FIG. 2 is a view in partial section of what is sometimes called a sphere tester. It includes the precision made spherical body 5 fixedly attached to a strong magnet 12. The magnet 12, which may have a cylidrical shape, fits within a larger cylindrical recess 13*d* of a sphere-support frame 13. The magnet 12 has a flat top surface 12*a* which adjustably adheres to the metal downwardly-facing surface 13*a* of the defining walls of the recess 13*d*. The frame 13 has a hollow cylindrical projection 13*b* projecting upward from the top thereof and fittable within a vertical bore 15*a* of a tool holder 15. The projection 13*b* of the sphere tester has a threaded vertical bore 13*b*' opening onto the top thereof for receiving an anchoring screw 14 forming part of the spindle assembly.

The defining walls of the cylindrical recess 13*b* of the sphere tester frame 13 has two pairs of confronting threaded recesses spaced at right angles to each other, threadingly to receive two pairs of adjusting screws 16*a*—16*a* and 16*b*—16*b*. The ends of these screws bear against the opposite sides of the magnet 12 to hold the spherical body 5 attached thereto in a variety of selected adjusted positions against the downwardly facing surface 13*a* of the defining walls of the frame recess 13*a*. In this manner, the center 5*b* of the spherical body 5 can be moved in both x and y-axis directions to place the center 5*b* thereof in a position where the cutting edge of the tool bit is desriably to be located. This position is obtained in a manner to be explained in detail below.

As shown in FIG. 3, the bottom of the spindle 7 has a downwardly opening tapered bore 7*a* which communicates with a vertical bore 7*c* through which an anchoring screw 14 passes. The tool holder 15 has a tapered upper end which fits up into the tapered bore 7*a* of the spimdle 7 at which time the screw 14 is threaded down into the threaded bore 13*b*'of the frame projection 13*b* to draw the sphere tester and tool holder tightly upwards in the conventinal way tool holders are locked to the spindle bottom. The tool holder 15 has at the top thereof a bore 15*c* of smaller diameter than the sphere tester frame projection-receiving bore 15*a* with which it communicates, to provide a shoulder against which the screw 14 pulls the upper end of the sphere tester frame projection 13*b*.

Method to Determine Offset by Rotational Symmetry Including References to FIGS. 1–4, 5*a*, 5*b* and 6

Referring to FIGS. 1 and 3, the first operation is to adjust the position of the center 5*b* of the spherical body 5 to the desired tool bit center represented by the final adjusted position of the spherical body center 5*b*. This is done by pointing one of the laser beams of laser heads 1*a* or 1*b* in the x or y axis direction. Then the spindle is manually rotated and both pairs of screws 16*a*—16*a* and 16*b*—16*b* are adjusted as the spindle is rotated so that there is a minimum change in the distance measurements during such rotation.

Then, the center 5b of the spherical body is as close to the center of the spindle axis as is possible. With the spindle stationary, the tool holder 15 together with the sphere tester carried thereby are now removed from the stationary spindle, manually rotated 180 degrees and then re-attached to the spindle. Because of the symmetry involved, there is now an offset Δ1+Δ2 shown in FIG. 4 between the spindle axis 7b and the desired tool bit or sphere center 5b, namely twice the actual offset between the spindle axis of rotation and the tool bit or sphere center.

When the spindle is now (manually or otherwise) rotated from X to −X and from Y to −Y, the maximum difference in the X direction is ΔXM and in Y direction is ΔYM. The offset between the spindle axis of rotation and the tool or sphere center can be determined by $$\Delta = 0.25 * SQRT[\Delta XM * \Delta XM + \Delta YM * \Delta YM],$$ Eq. 13

$$\phi = \text{Arctan } [\Delta YM/\Delta XM].$$ Eq. 14

Hence the offset can be determined without the need of a heavy and calibrated precision tester. The accuracy of this measurement is limited by the roundness of the sphere.

Referring now to FIG. 1, when obtaining motion error measurments under actual spindle operating speeds, laser heads 1a and 1b in FIG. 1 can be simultaneously operated to direct their beams in the x and y axis directions shown and the outputs fed to the data processing, storage and display means 9 shown. Spindle wobbling transverse to the y and x axes shown can produce the sinusoidal and co-sinusoidal data waveforms respectively shown in FIGS. 5a and 5b. This data resulted from a spindle rotatinal speed of 100 rpm and the data rate was 125 data/second. When such data was fed in the form of voltages forming these waveforms to the x and y inputs of a cathode ray tube or other similar display means then the circular pattern of spindle error motion produced is shown in FIG. 6.

Figure 8:
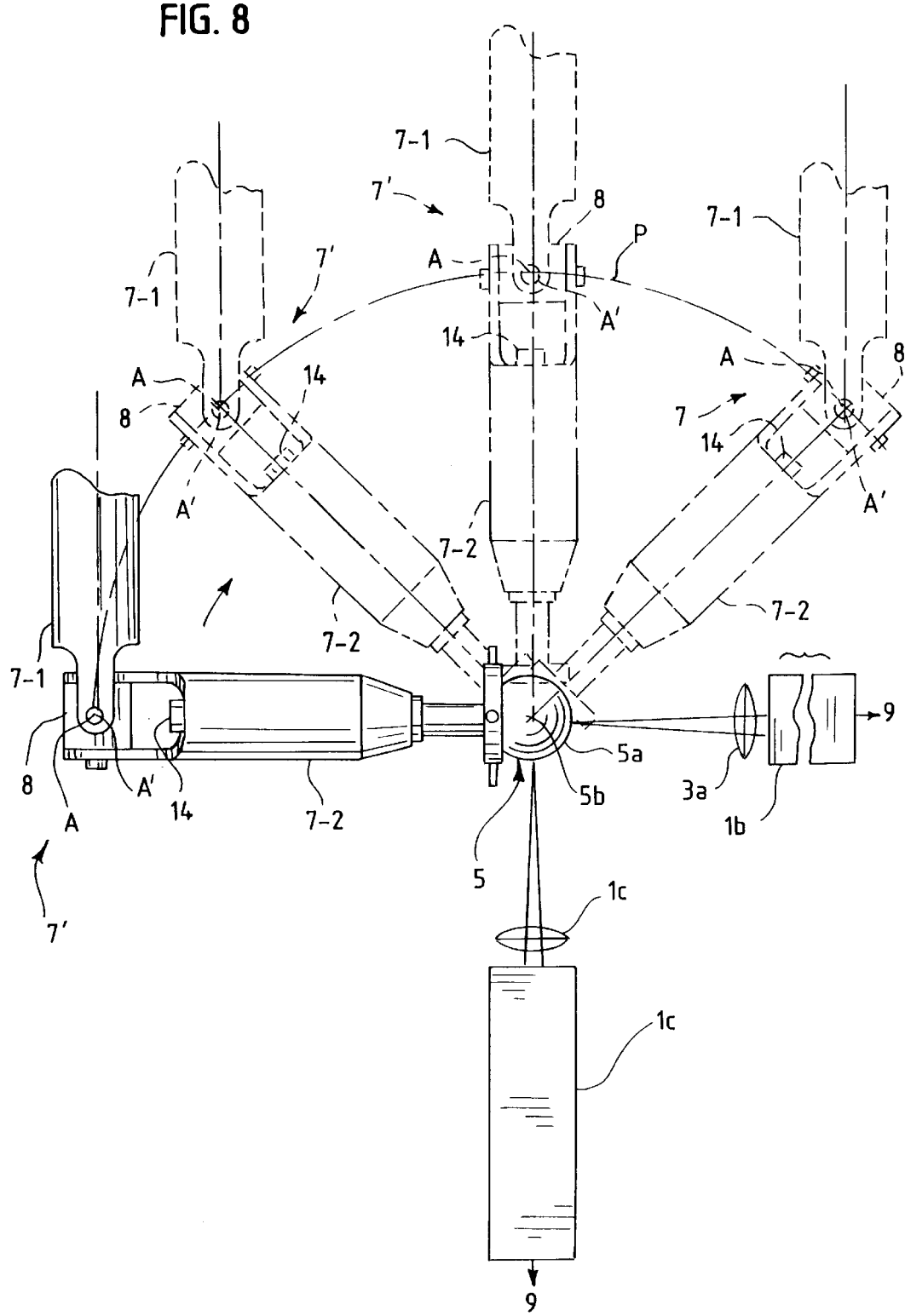
FIG. 8 is an elevational view of FIG. 7 taken in the y-z plane and shows the outer spindle portion 7-2 being driven in a clockwise direction by the A axis drive shaft A' while the continuously z-axis directed and non-rotating inner portion 7-1 of the spindle 7' is bodily moved along a circular path which keeps the center 5*a* of the spherical reflecting surface of the sphere tester in an assumed fixed position in the absence of any spindle wobbling.

FIGS. 7 and 8

FIGS. 7 and 8 illustrate how the present invention can be used to practice the present invention on a 5 axis machine. In such a machine the spindle 7' has a main inner portion 7-1 which can be rotated about its vertical z-directed axis 7b or be moved bodily while not rotating along various paths. In FIG. 8 the path is a circular path P. The spindle 7' has an outer portion 7-2 which can be rotated relative to the inner portion 7-1 by an x-axis directed drive shaft A' rotated about axis A, or which can be be rotated relative to the inner portion 7-1 by a y-axis directed drive shaft B' rotated about axis B. The drive shafts A' and B' can be part of a universal joint 8 carrying drive motors (not shown) for these shafts and located between the inner and outer portions 7-1 and 7-2 of the spindle 7'. When the outer and inner portions 7-2 and 7-1 are locked together in alignment they can be rotated together about a z-directed vertical axis C.

FIG. 8 shows the inner portion 7-2 of the spindle 7' being rotated by drive shaft A' about axis A so that the center of the spherical body 5 attached to the outer end of the outer spindle portion 7-2 remains at the same point except for the error motion of the spindle.

FIG. 7 shows that the error motion in the x, y and z axis directions are measured by the x, y and z-axis directed beams of laser heads 1a, 1b and 1c. (A z axis-directed laser head like head 1c could also be used in the 3 axis machine shown in FIG. 1 to measure the vertical motion error of the spindle 7 there shown.)

For a 5-axis machine tool it is very important to calibrate for spindle movement about the two rotational axes, A and B or A and C (C being the same as the z axis). While these axes are theoretically at right angles to each other and intersect, they could be somewhat skew, non-orthogonal and non-intersecting which can cause serious tool bit motion errors. Hence it is important to measure the angular accuracy of the two pairs of rotational axes A and B or A and C shown in FIG. 7, by a tool tip positing measurement now to be described.

Measurements of the tool-tip displacement errors are made at various rotational angles and these measurements can be used to calibrate or to compensate the angular errors of the 2 pairs of rotational axes. It can also be used to measure the tool tip positioning errors dynamically at various tool paths and geometries.

After the laser heads 1a, 1b and 1c are oriented as shown in FIG. 7, the laser beams are focussed by the lens 3a, 3b and 3c in directions perpendicular to the surface of the precision spherical body 5. Then the spindle portions 7-1 and 7-2 best shown in FIG. 8 are moved relative to the x, y, and z(C) axes, and the rotational axes A and B such that the center of the tool bit tip represented by the center 5b of the precision sphere 5 is at a fixed position. Measuring the changes of the sphere center positions due to various movements, the angular errors of during the rotation about the pivot axes involved at various angles are determined from the laser head outputs.

The machine coordinates using rotational axes A and B can be defined as (X, Y, Z, and angles A and B). The centers of rotation of rotational axes A and B are defined as (Xp, Yp, Zp). The coordinates of the center 5b of the sphere 5 are defined as (Xt, Yt, Zt).

The relations involved are:

$$Xp = X + Cx,$$

$$Yp = Y + Cy,$$

$$Zp = Z + Cz,$$

where Cx, Cy, and Cz are constants.

$$Xt = Xp + R \sin A \cos B,$$

$$Yt = Yp + R \cos A \sin B,$$

$$Zt = Zp + R \cos A \cos B,$$

Where R is the distance between center of rotation and the center of the sphere 5.

To calibrate the A-axis angular accuracy, mount the laser head 1a pointing to the x-axis as shown in FIG. 1. The starting position is at Xp=Zp=A=B=0. Move the spindle part 7-2 about the A-axis in 5 or 10 degrees increments, while keeping the sphere center position fixed. That is, $$Xp = -R \sin A$$

$$Zp = -R(1 - \cos A),$$

where A=0,10,20 . . . 90 degrees.

Hence, dA=−dXp/(R cos A), where dA is the angular error at A degrees and dXp is dXp is the measured deviation at A degrees. The outputs of the laser heads 1a, 1b and 1c provide the error measurements involved.

A summary of some of the features of the invention are:
1. A non-contact laser measurement apparatus for the axes of rotation error motion measurement using two laser interferometer or displacement meters.
2. A new design including a precision sphere, magnetic holder and fine adjustment with fine threaded screws.

3. A method for determining the offset based on the rotational symmetry without the need of a calibrated precision tester.

4. A method for the axes of rotation total error motion measurement using one or two laser systems, including the radial error motion, tilt error motion and axial error motion.

It should be understood that numerous modifications and additions can be made in the exemplary forms of the invention discolosed herein without deviating from the broader aspects of the invention. However, these exemplay forms of the invention when claimed as such should be considered specific improvements over the broad forms thereof. Also, while the claims refer to a rotatable spindle as the motion error creating element being measured, the word "spindle" should be interpreted to cover any rotating element whether or not it is technically a spindle.

REFERENCES

1. J. Bryan, R. Clonser and E. Holland, "Spindle accuracy", American Machinist, Dec. 4, 1967.
2. Axes of rotation, methods for specifying and testing, An American National Standard, ASME B89.3.4M-1985 by the American Society of Mechanical Engineers, 1985.
3. Charles Wang and Joe Zhou, Interferometer requiring no critical component alignment", U.S. Pat. No. 5,116,126, May 26, 1992.
4. Charles Wang, "Laser vector measurement technique for the determination and compensation of volumetric positioning errors. Part I: basic theory", Review of Scientific Instruments, Vol. 71, No. 10, pp3933–3937, October 2000.
5. Charles Wang and Bob Griffin, "A non-contact laser technique for the circular contouring accuracy measurement", Review of Scientific Instruments, Vol. 72, No. 2, February 2001.

I claim:

1. Motion error testing apparatus useable for testing the error motion of the inner end of a spindle rotated about a first longitudinally extending axis or the outer end of a spindle rotatable about a different axis while the inner end remains in a fixed orientation, said apparatus including:

a frame having a mounting portion attachable to the outer end of said spindle and an opposite portion having a recess opening onto the end of said opposite portion at the frame;

an energy beam-reflecting unit having an inner mounting portion adjustably mounted within said recess and an outer portion located outside of said recess, said outer portion having a curved beam-reflecting surface presenting beam-reflecting points to be spaced varying distances from a source of beam energy to be directed initially to the nearest point on said curved surface, the beam striking other points of said surface if the spindle should wobble in directions transverse to the beam direction, the beam traverse distance to and from the beam source thus being a measure of the spindle error motion;

and said frame having thereon means for adjusting the position of said beam reflecting unit in said recess so that a point on said beam-reflecting unit can be adjusted.

2. The motion error testing unit of claim 1 wherein said reflecting surface is a spherical surface and said point of the beam-reflecting unit is the center of the sphere involved.

3. The motion error testing unit of claim 1 combined with a tool holder into which said frame mounting portion is inserted, said tool holder being mounted upon the outer end of said spindle, and a source of said beam energy directed initially toward the nearest point of said curved surface and associated beam traverse distance measuring apparatus for measuring the beam traverse distances involved and where needed focussing means for focusing the reflected beam back to said measuring apparatus when the spindle is rotated about one of said axes and the spindle wobbles transversely of the beam direction.

4. The combination of claim 1 wherein the inner end of said spindle remains in a fixed orientation and is not rotated while the outer end thereof is rotated about said second axis and the inner end of the spindle is bodily moved in a path which keeps the beam of energy directed against the nearest point of said curved surface on the assumption the spindle does not wobble in said transverse direction.

5. The combination of claim 3 wherein the inner end of said spindle remains in a fixed orientation and is not rotated while the outer end thereof is rotated about said second axis and the inner end of the spindle is bodily moved in a path which keeps the beam of energy directed against the nearest point of said curved surface on the assumption the spindle does not wobble in said transverse direction.

6. The motion error testing apparatus of claim 1 wherein said adjusting means include a first pair of adjusting screws threaded into a first pair of aligned bores on the opposite sides of the walls which define said frame recess and engageable with opposite sides of the inner mounting portion of said beam-reflecting unit and a second pair of adjusting screws threaded into a second pair of bores aligned at right angles to said first pair of bores and formed in opposite sides of said recess defining walls to engage with opposite sides of the inner mounting portion of said beam reflecting unit.

7. The motion error testing apparatus of claim 1 wherein one of the inner mounting portion of is said beam-reflecting unit and said frame is a magnet and the other of same includes a magnet-attracting surface which slidably holds the beam-reflecting unit in an adjusted position.

8. The combination of claim 1 wherein said reflecting surface is a spherical surface, said point of said beam-reflecting unit is at the center of the sphere, and said first and second axes are at right angles to each other; and said outer end of said spindle is also rotatable about a third axis at right angle to both said first and second axes; and there is provided a source of beam energy and an associated beam traverse distance measuring apparatus like said first measuring apparatus for measuring the beam traverse distances involved.

9. Apparatus for measuring the motion error of a rotating spindle having an inner end which has a first possible axis of rotation, said apparatus including:

a first energy beam distance traverse measuring system including a first source of beam energy to be directed at a beam-reflecting surface to be attached to the outer end of said spindle and an associated beam traverse distance measuring means for measuring the distance the beam directed by said first source traverses as it goes from the beam directing point to said reflecting surface and then is reflected back to a reflected beam-receiving point which can be the same or different point than said beam directing point;

a frame attachable to the outer end of said spindle and an energy beam-reflecting surface mounted on said frame so that it can receive and reflect beam energy directed thereto from a given beam directing point, said surface having at least one beam receiving area with points spaced varying distances from said beam directing point so that if the beam is directed toward the nearest point of said surface assuming said spindle ideally does not wobble in any direction transverse to said possible axis of rotation of said spindle said beam will strike the nearest point thereof and if said spindle wobbles in said transverse direction the distances between the beam source and the beam reflecting point on said surface will increase in proportion to the amount the spindle has moved transversely from the ideal axis position, said measuring means providing a measure of the varying distance said beam traverses as said spindle carrying the reflecting surface rotates about said axis.

10. The apparatus of claim 9 wherein there is further provided a second energy beam distance traverse measuring system like said first system including a second source or beam energy to be directed at said beam-deflecting surface in a direction transverse to said spindle axis of rotation and transverse to the direction of the beam generated by said first source of beam energy and a second measuring means like said first measuring means, said second measuring means providing a measure of the varying distance the beam of said second source of beam energy traverses as said spindle carrying the reflecting surface rotates; the measurements made by said first and second measuring means providing respectively distance verses time measurements for each revolution of said spindle constituting sinusoidal and co-sinusoidal-like waveform-producing data; and data processing means for summing said waveform-producing data representing the total spindle error motion for the various angles of rotation of said spindle during which said measurements are taken.

11. The apparatus of claim 10 where said data processing means produces a visible circular waveform representing the combination of said waveform-producing signals indicating the degree to which said spindle wobbles for the various angles of rotation of said spindle.

12. The apparatus of claim 9 wherein said frame has means for separately adjusting the position of said beam-reflecting surface on said frame along each of two orthogonal adjusting axes which are transverse to the spindle axis of rotation.

13. A method of measuring the error motion of a rotating spindle comprising the steps of:

attaching to the outer end of a spindle having at least one axis of rotation an energy beam-reflecting surface having a first surface area facing in a first direction transverse to said axis of rotation and which has points located progressively varying distances from a source of beam energy to be directed thereat in said first direction;

directing a first source of said beam energy in said first direction; and imparting rotation to said spindle and providing a measure of the variation of the distance between said first beam source and said reflecting surface area over at least one rotation of said spindle, any wobbling of said spindle in a direction transverse to said first direction causing said beam to strike points of said reflecting area of varying distance from said first source in proportion to the degree to which the spindle wobbles in said transverse direction.

14. The method of claim 13 wherein said reflecting surface is a spherical surface.

15. The method of claim 13 wherein a second energy beam source is provided to direct a second energy beam toward said surface in a direction transverse to said spindle axis of rotation and transverse to the direction said first beam is directed;

imparting rotation to said spindle about said axis of rotation and measuring the variation of the distance between said second beam source and the beam's reflecting point on said surface at the same time said other distance measurement is taken so that the distance verses time measurement data is obtained for each revolution of said spindle to provide respectively relative sinusoidal and co-sinusoidal-like waveform-producing data for at least a single revolution of said spindle;

and summing said waveform data to produce data representing the total spindle error motion for the various angles of rotation of said spindle for which said measurements are taken.

16. The method of claim 14 including the step of adding together said relative sinusoidal and co-sinusoidal-like waveform-producing data to produced a visible circular waveform-like pattern which visibly shows the degree of total transverse spindle error motion for the various spindle angles for which measurements are taken.

17. The method of claim 13 wherein said reflecting surface is one of a spherical and cylindrical surface and there is provided a support frame for said reflecting surface which frame is fixedly attached to the outer end of said spindle, said reflecting surface being supported on said frame so that it can be separately adjusted in position relative to said frame along the one or two orthogonally related adjusting axes involved which are substantially at right angles to the associated beam direction or directions;

imparting rotation to said spindle and while measuring said changes in beam traverse distances adjusting the position of said beam reflecting surface along said adjusting axis or axes to minimize the maximum distance measurements involved, so that the center or axis of the spherical or cylindrical surfaces are as close as possible to the axis of the ideal spindle, to minimize the effect of off-centered positions of said surface on the spindle error motion determination involved;

and wherein the measurements referred to in claim 13 are taken after the reflecting surface adjustments just referred to are taken.

18. The method of claim 17 wherein after said adjustments referred to therein are made and before the measurements referred to in claim 13 are taken and while said spindle is stationary said reflecting surface is rotated 180 degrees relative to its previous mounted position and maintained in such rotated position while said measurements referred to in claim 13 are taken.

19. The method of claim 13 wherein said beam-reflecting surface is one of a spherical and cylindrically shaped surface.

20. The method of claim 13 wherein said spindle is a machine tool spindle which is to carry a cutting tool having a cutting edge or point thereon and said reflecting surface is one of a spherical or cylindrical surface, the center or axis of the spherical or cylindrical beam-reflecting surface being located at the desired cutting edge or point of the tool.

21. The method of claim 13 wherein there is provided between each laser beam path measuring system and said beam-reflecting surface a focus lens which receives the beam reflected from said beam-reflecting surface and focuses the reflected beam back to said beam directing and receiving portion of said measuring system.

22. The method of claim 13 applied to a machine where the spindle has an inner portion rotatable about its longitudinal axis and an outer portion which can be rotated about second or third axes of rotation which are at right angles to each other and transverse to said longitudinal axis; said reflecting surface is a spherical surface; while said inner and outer portions of said spindle are fixed in alignment and the spindle is rotated about its longitudinal axis carrying out said method of claim 13.

23. The method of claim 13 wherein said reflecting surface is a spherical surface, said spindle has an inner portion which can be rotated about its longitudinal axis but is kept from such rotation during the carrying out of the method recited therein, said spindle has an outer portion which is selectively rotatable relative to the non-rotatable inner spindle portion about either a second or third axis at right angles to each other and to said longitudinal axis; said method of claim 13 being carried out while said outer end of said spindle is rotated about said second axis while the inner end portion of said spindle carrying the outer end portion thereof is bodily moved along a path which keeps the energy beam involved directed toward what would be the nearest portion thereof if there was no transverse wobbling of said inner rotated portion.

24. The method of claim 23 repeated for the circumstance where the outer spindle portion is rotated about said third axis.

25. The method of claim 24 repeated for the circumstance where the inner and outer portions of the spindle are aligned and rotated about said longitudinal axis.

* * * * *